United States Patent [19]
Downs et al.

[11] Patent Number: 5,548,324
[45] Date of Patent: Aug. 20, 1996

[54] PROCESS, APPARATUS AND SYSTEM FOR DISPLAYING MULTIPLE VIDEO STREAMS USING LINKED CONTROL BLOCKS

[75] Inventors: Terry Downs, Forest Grove; Judith A. Goldstein, Hillsboro, both of Oreg.

[73] Assignee: Intel Corporation, Santa Clara, Calif.

[21] Appl. No.: 243,204

[22] Filed: May 16, 1994

[51] Int. Cl.$^6$ .................. H04N 7/10; G06F 9/00

[52] U.S. Cl. .............. 348/15; 365/230.03; 365/189.01; 364/245.6; 364/940.3; 364/957.3; 345/189

[58] Field of Search ...................... 348/15 OR, 16; 365/230.03, 189.01, 189.04, 230.01, 230.08, 219; 395/275, 425, 725, 500; 364/242.31, 254.6, 940.3, 957.3, DIG. 1, DIG. 2, 407; 345/189, 190, 191; H04N 7/10

[56] References Cited

U.S. PATENT DOCUMENTS 5,247,520  9/1993  Geise et al. .................. 395/500
5,369,617  11/1994  Munson .................. 365/230.03
5,408,261  4/1995  Kamata et al. .................. 348/15

*Primary Examiner*—Safet Metjahic
*Assistant Examiner*—Cheryl Cohen
*Attorney, Agent, or Firm*—Steve Mendelsohn; William H. Murray

[57] ABSTRACT

A computer-implemented process, apparatus, and system for displaying multiple video streams at the same time on a single display monitor, where at least two of the video streams may have different frame rates. Data structures containing linked control blocks are used to process the multiple video streams, where each control block contains information used in scaling and converting a single unscaled bitmap corresponding to a single frame of a video stream. In a preferred embodiment, the invention provides video conferencing capabilities between multiple remotely located participants.

33 Claims, 2 Drawing Sheets

Video Subsytem

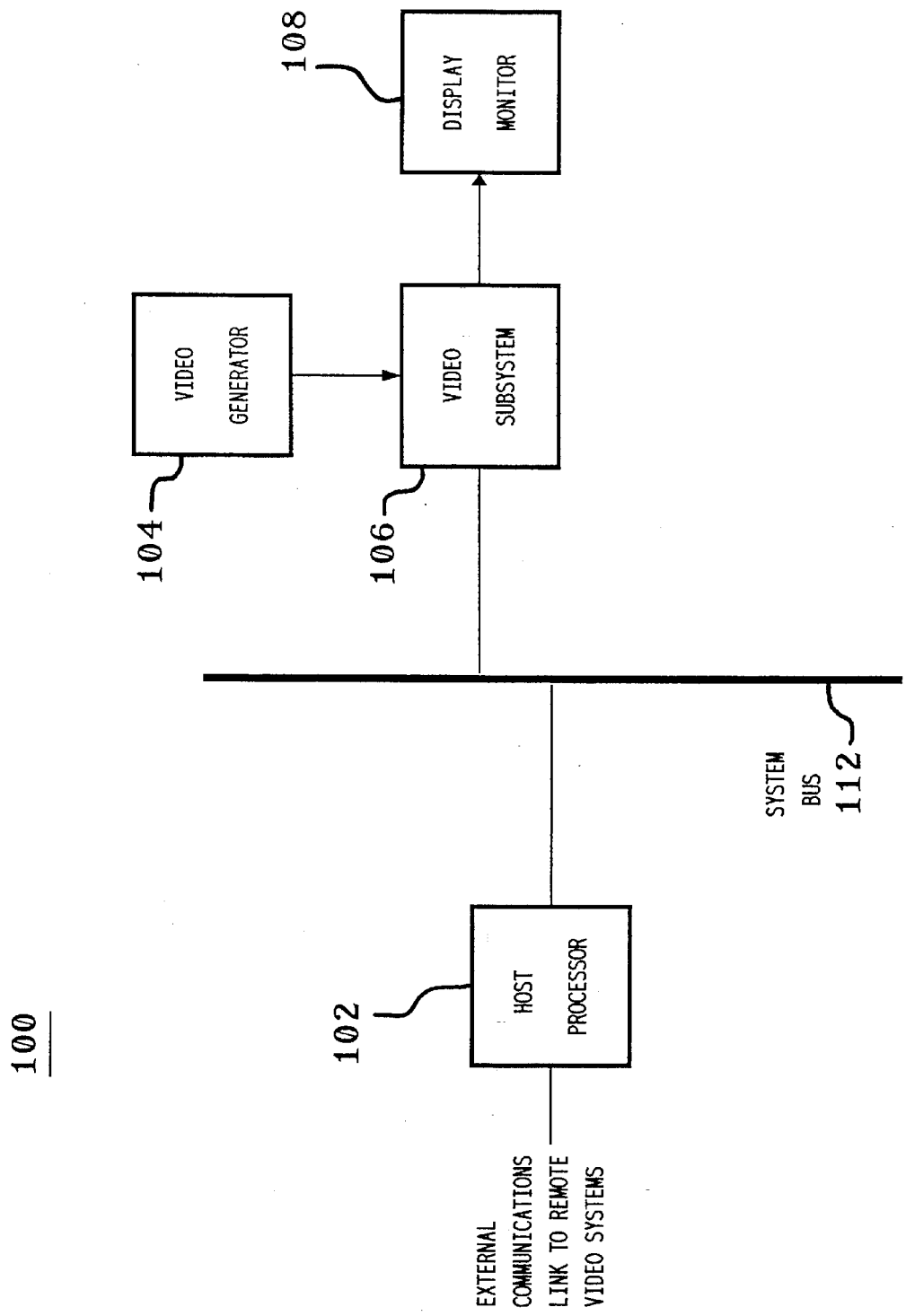

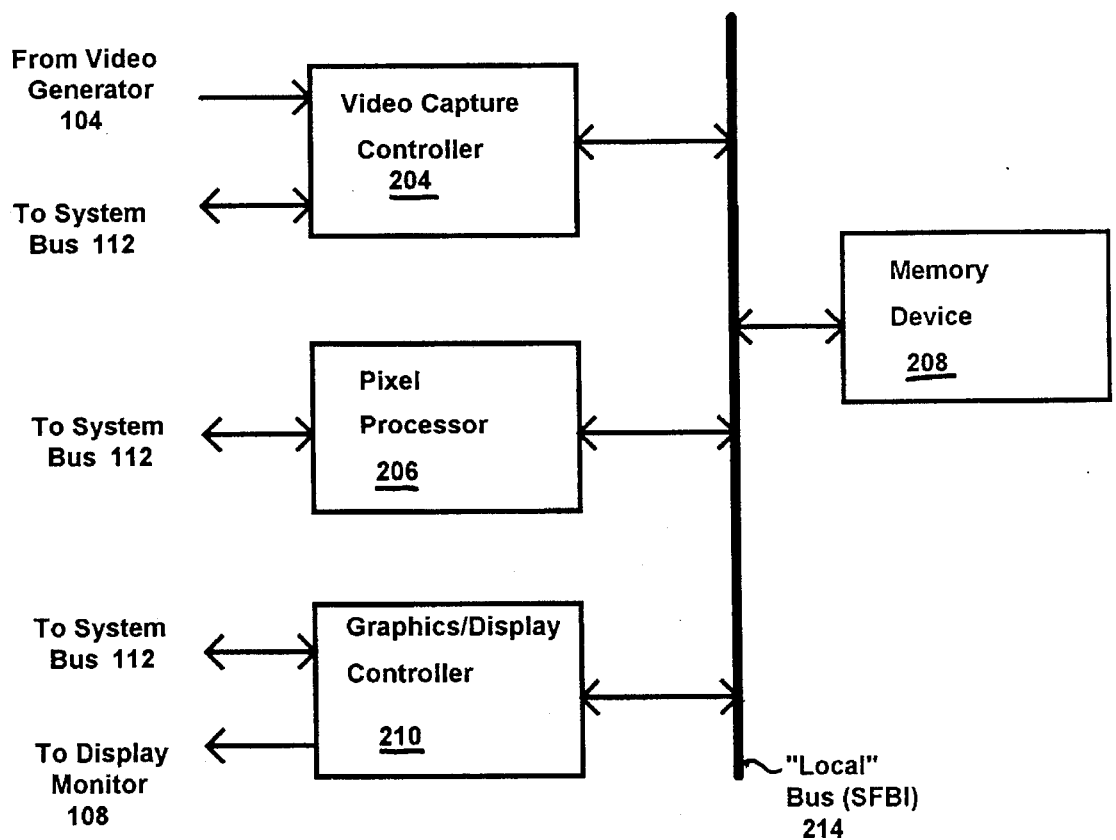
Figure 2 Video Subsytem

PROCESS, APPARATUS AND SYSTEM FOR DISPLAYING MULTIPLE VIDEO STREAMS USING LINKED CONTROL BLOCKS

BACKGROUND OF THE INVENTION

1. Field of the Invention

The present invention relates to video signal processing, and, in particular, to computer-implemented processes, apparatuses, and systems for displaying multiple video streams on a single display monitor.

2. Description of the Related Art

It is desirable to provide a system for displaying multiple video streams on a single display monitor, where at least one of the video streams has a frame rate different from that of at least one of the other video streams.

Conventional systems for displaying video signals, such as the Intel® ActionMedia® II video system, comprise a pixel processor, a memory device, and a display controller. The pixel processor decodes encoded signals for a video stream and stores the decoded signals as unscaled bitmaps in the memory device. The pixel processor scales the unscaled bitmap signals for display and stores the scaled signals as scaled bitmaps back to the memory device. The display controller converts the scaled signals to a format suitable for display on a display monitor. In addition, the display controller optionally merges the converted video signals with graphics signals from the graphics processor and/or scales the bitmap signals yet again, before transmitting the merged signals to the frame buffer of the display monitor for display.

In order to display video signals at frame rates representative of real-time motion, the various components of such conventional video systems function concurrently. To support this concurrent processing, conventional video systems maintain a circular buffer of multiple bitmaps in the memory device for each video stream being processed. While the display controller is converting the scaled bitmap for video frame i (stored in a first position of the memory device), the pixel processor is generating the scaled bitmap for video frame i+1 (stored in a second position of the memory device) by scaling the unscaled bitmap for video frame i+1 (stored in a third position of the memory device). At the same time, the pixel processor is generating the unscaled bitmap for video frame i+2 (stored in a fourth position of the memory device), using the unscaled bitmap for video frame i+1 (stored in the third position of the memory device) as a reference for the decoding process. These bitmaps are overwritten in a circular fashion as a sequence of frames is processed.

To display multiple video streams at the same time in different windows within the raster of a display monitor, the total number of bitmaps that the video system maintains in the memory device is the product of the number of video streams and the number of bitmaps required for each video stream. In a conventional video system, the display of multiple video streams would be controlled by software.

If at least some of the video streams have different frame rates, then the software of the conventional video system would orchestrate the processing of each video stream separately to ensure that the proper video frames of each video stream are processed and displayed at the proper times and in the proper positions within the display raster. This is an unwieldy process. Moreover, the signal data and processing bandwidth limitations of conventional video systems limit the capability of such systems to display multiple video streams on a single display monitor.

What is needed is an improved video system for displaying multiple video streams on a single display monitor where at least some of the video streams have different frame rates.

It is accordingly an object of this invention to overcome the disadvantages and drawbacks of the known art and to provide a video system for displaying multiple video streams on a single display monitor where at least some of the video streams have different frame rates.

It is a further object of this invention to provide a video system for providing video conferencing capabilities between multiple remote participants.

Further objects and advantages of this invention will become apparent from the detailed description of a preferred embodiment which follows.

SUMMARY OF THE INVENTION

The present invention is a computer-implemented process, apparatus, and system for displaying a plurality of video signals on a display monitor. The plurality of video signals comprises a video signal A and a video signal B. According to a preferred embodiment of the present invention, the system comprises a host processor, a display monitor, and a video subsystem. The video subsystem comprises a memory device and a display controller. The host processor controls the operations of the system. The video subsystem generates n bitmap signals $A1, A2, \ldots, An$ corresponding to the video signal A and generates m bitmap signals $B1, B2, \ldots, Bm$ corresponding to the video signal B. The memory device stores the bitmap signals $A1, A2, \ldots, An$ in s memory positions in a circular fashion and stores the bitmap signals $B1, B2, \ldots, Bm$ in t memory positions in a circular fashion. The host processor generates a plurality of data structures, each data structure comprising a plurality of control blocks, each control block comprising information for controlling the display of one of the bitmap signals $A1, A2, \ldots, An$ and $B1, B2, \ldots, Bm$. The display controller displays the bitmap signals $A1, A2, \ldots, An$ and $B1, B2, \ldots, Bm$ on the display monitor in accordance with the plurality of data structures.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 1 is a block diagram of a system for displaying one or more video streams on a single display monitor, according to a preferred embodiment of the present invention; and FIG. 2 is a block diagram of the video processing subsystem of the system of FIG. 1.

DESCRIPTION OF THE PREFERRED EMBODIMENT(S)

Referring now to FIG. 1, there is shown a block diagram of video system 100 for displaying one or more video streams on a single display monitor, according to a preferred embodiment of the present invention. Video system 100 comprises host processor 102, video generator 104, video subsystem 106, display monitor 108, and system bus 112.

One possible application for video system 100 is in video conferencing between two or more remotely located participants, where each participant uses a local video system 100. Video system 100 generates encoded video signals corresponding to the participant and transmits the encoded video signals to each of the other remote participants. At the same time, video system 100 receives encoded video signals from each of the other remote participants, and decodes and displays those video signals within multiple windows in the raster of the display monitor. Those skilled in the art will understand that, if desired, video system 100 can display video signals for all of the video conference participants including the local participant.

In particular, for each participant, video generator 104 of video system 100 generates analog video signals of the local participant. Video subsystem 106 decodes the analog signal into component signals (e.g., Y, U, and V, or R, G, and B), digitizes each component signal, and encodes the digital signal for each component. Host processor 102 accesses the encoded video signal from video subsystem 106 via system bus 112 and transmits the encoded video signal to each of the remote participants via an external communications path.

At the same time, host processor 102 receives an encoded video signal from each of the other participants via the external communications path and transmits the multiple encoded video signals to video subsystem 106 via system bus 112. For one or more video streams, video subsystem 106 decodes the encoded video signal, and scales and converts the decoded signal for display. In addition, video subsystem 106 optionally merges the multiple video signals with graphics signals and transmits the merged signals for display on display monitor 108.

Those skilled in the art will understand that video system 100 also preferably has an audio subsystem (not shown in FIG. 1). The audio subsystem provides for capture, compression, transmission, receipt, decompression, and playback of the audio signals from the participants of the video conference.

Host processor 102 may be a conventional personal computer and is preferably an Intel® Xpress Desktop Computer based on an Intel® architecture processor, where an Intel® architecture processor is an Intel286™, Intel386™, Intel486™, or Pentium™ processor. Video generator 104 may be a conventional video camera and is preferably a Panasonic 5100HS Video Camera. Display monitor 108 may be a conventional display monitor and is preferably an NEC MultiSync 4FGe monitor. System bus 112 may be a conventional digital data bus and is preferably an Extended Industry Standard Architecture (EISA) bus. The external communications path between the video systems 100 of the video conference participants is preferably an Integrated Services Digital Network (ISDN) line.

Referring now to FIG. 2, there is shown a block diagram of video subsystem 106 of system 100 of FIG. 1 for displaying one or more streams of video signals on a single display monitor, according to a preferred embodiment of the present invention. Video subsystem 106 supports the capture, encoding, and transmission of video signals for the local video conference participant as well as the receipt, decoding, and display of video signals from each of the other remote video conference participants.

Specifically, video capture controller 204 receives an analog video signal from video generator 104 of FIG. 1, and decodes and digitizes the analog signal into digital signals for three components. Capture controller 204 also scales the digital signals for capture and stores the captured signals as captured bitmaps in memory device 208 via subsystem bus 214. Pixel processor 206 accesses the captured signals from memory device 208 via subsystem bus 214, encodes the captured signals, and stores the encoded signals back to memory device 208 via subsystem bus 214. Host processor 102 of FIG. 1 then accesses the encoded video signals from memory device 208 via subsystem bus 214, graphics/display controller 210, and system bus 112 for transmission to each of the other video conference participants.

At the same time, graphics/display controller 210 receives one stream of encoded video signals for each of the other video conference participants from host processor 102 via system bus 112 for storage in memory device 208 via subsystem bus 214. For each video stream, pixel processor 206 accesses the encoded signals from memory device 208 via subsystem bus 214, decodes the encoded signals, and stores the decoded signals as unscaled bitmaps back to memory device 208 via subsystem bus 214.

Graphics/display controller 210 accesses the unscaled signals from memory device 208 via subsystem bus 214, scales and converts the unscaled signals for display, optionally merges the multiple scaled and converted video signals with graphics signals, and transmits the merged signals to display monitor 108 for display.

Video capture controller 204 may be a conventional means for decoding, digitizing, and capturing video signals and is preferably an ATI 68890 capture processor. Pixel processor 206 may be a conventional video processor and is preferably an Intel® 82750PD pixel processor. Subsystem bus 214 may be a conventional digital data bus and is preferably a shared frame buffer interconnect (SFBI) bus. Memory device 208 may be a conventional device for storing digital signals and is preferably a dynamic random access memory (DRAM) device, such as an OKI M514256B-60J device. Graphics/display controller 210 may be a conventional controller for merging and scaling graphics and video for display and is preferably an ATI 68800DX display processor.

In a preferred embodiment of the present invention, the processing of graphics/display controller 210 is controlled by data structures that contain linked control blocks. Each data structure contains one control block for each bitmap in memory device 208 used to process each video stream. Each control block contains information about the scaling, converting, and merging of a single unscaled bitmap in memory device 208 for display. For example, a control block may comprise (at least) the following information:

Color space of source (i.e., components of unscaled bitmap);

Color space of destination (i.e., components for display raster);

Pixel format of source (i.e., full resolution or a subsampled format);

Dimensions of source (i.e., length and width of unscaled bitmap);

Dimensions of destination (i.e., length and width of display window within display raster);

Position of source (i.e., location in memory device 208 of unscaled bitmap); and Position of destination (i.e., location of display window within display raster).

In a preferred embodiment, graphics/display controller 210 may be used either to scale up (i.e., enlarge) or scale down (i.e., shrink) the unscaled bitmaps. In addition, graphics/display controller 210 may convert the unscaled bitmaps for display from one video format (e.g., subsampled YUV 4:1:1) to another video format (e.g., RGB24). Moreover, graphics/display controller 210 may position the display window for the video stream anywhere within the display raster.

In addition to the above listed information, a control block preferably contains an enable/disable flag and a link pointer. The enable/disable flag indicates whether the particular control block is enabled or disabled. The software preferably sets the flag and the hardware preferably reads the flag to determine whether to display the corresponding frame. If the control block is enabled, then the indicated bitmap is displayed in the current control cycle using the information in the control block. If the control block is disabled, then the indicated bitmap is not displayed in the current control cycle. The link pointer points to the location of the next control block in the linked data structure. Since the control blocks within a data structure are linked, all of the control blocks in a data structure may be executed with a single command to execute the first control block in the data structure.

One data structure contains information used to process one frame for each of the multiple video streams to be displayed within the display raster for a control cycle i. In a preferred embodiment, the data structure for control cycle i is updated for use in processing the video frames for control cycle i+1.

The following example is provided to demonstrate the use of linked data structures according to a preferred embodiment of the present invention. Assume there are two video streams A and B, each of which uses a circular buffer containing three bitmaps. Assume further that video streams A and B both have frame rates of 30 frames per second (FPS). Table I presents the enable/disable flags for the first four control cycles of this example, where "E" means enabled and "D" means disabled.

TABLE I

Enable/Disable Flags for Linked Data Structures
(A = B = 30 FPS)

| CONTROL CYCLE | BITMAPS | | | | | |
|---|---|---|---|---|---|---|
| | A1 -> | A2 -> | A3 -> | B1 -> | B2 -> | B3 |
| 1 | E | D | D | E | D | D |
| 2 | D | E | D | D | E | D |
| 3 | D | D | E | D | D | E |
| 4 | E | D | D | E | D | D |
| . | . | . | . | . | . | . |
| . | . | . | . | . | . | . |
| . | . | . | . | . | . | . |

As presented in Table I, in the first control cycle, the control blocks for bitmaps A1 and B1 are enabled and the control blocks for bitmaps A2, A3, B2, and B3 are disabled. Thus, for the first control cycle, bitmap A1 of video stream A and bitmap B1 of video stream B are scaled, converted, and merged for display as specified by the control blocks for bitmaps A1 and B1, respectively. In the second control cycle, the control block for only the second bitmap of each video stream is enabled, and analogously for the third control cycle. This three-cycle sequence repeats itself starting at the fourth control cycle.

Table II presents the enable/disable flags for the first seven control cycles for an example of two video streams A and B having three bitmaps each, where video stream A has a frame rate of 15 FPS and video stream B has a frame rate of 30 FPS.

TABLE II

Enable/Disable Flags for Linked Data Structures
(A = 15 FPS; B = 30 FPS)

| CONTROL CYCLE | BITMAPS | | | | | |
|---|---|---|---|---|---|---|
| | A1 -> | A2 -> | A3 -> | B1 -> | B2 -> | B3 |
| 1 | E | D | D | E | D | D |
| 2 | E | D | D | D | E | D |
| 3 | D | E | D | D | D | E |
| 4 | D | E | D | E | D | D |
| 5 | D | D | E | D | E | D |
| 6 | D | D | E | D | D | E |
| 7 | E | D | D | E | D | D |
| . | . | . | . | . | . | . |
| . | . | . | . | . | . | . |
| . | . | . | . | . | . | . |

In the example of Table II, a control block for each of video stream A and B is enabled in each control cycle. Since video stream A has a frame rate that is half the frame rate of video stream B, the control blocks for video stream A are updated half as frequently as the control blocks for video stream B. Thus, in the first control cycle, the control blocks for bitmaps A1 and B1 are enabled. For the second control cycle, the control blocks for bitmaps A1 and B2 are enabled. For the third control cycle, the control blocks for bitmaps A2 and B3 are enabled. By repeating the sequence of the first six control cycles of Table II, the display of each frame of video stream A is repeated to synchronize the display of video stream A with the display of video stream B.

Those skilled in the art will understand that, when each video stream is displayed in a fixed window within the display raster, only the enable/disable flags of the linked control blocks of the data structure need to be updated between control cycles.

Those skilled in the art will also understand that the present invention may be used to display two or more video streams having frame rates other than those in the above-described examples. The actual frame rates dictate the selection of the enable/disable flags in the sequence of control cycles.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for displaying a plurality of video streams on a display monitor, the plurality of video streams comprising a video stream A and a video stream B, comprising the steps of:

(a) generating n bitmap signals A1, A2, . . . , An corresponding to the video stream A;

(b) storing the bitmap signals A1, A2, . . . , An in s memory positions of a memory device in a circular fashion:

(c) generating m bitmap signals B1, B2, . . . , Bm corresponding to the video stream B;

(d) storing the bitmap signals B1, B2, . . . , Bm in t memory positions of the memory device in a circular fashion;

(e) generating a plurality of data structures, each data structure comprising a plurality of control blocks each control block comprising information for controlling the display of one of the bitmap signals A1, A2, . . . , An and B1, B2, . . . , Bm; and (f) displaying the bitmap signals A1, A2, ..., An and B1, B2, ..., Bm in accordance with the plurality of data structures, wherein the frame rate of the video stream A is different from the frame rate of the video stream B.

2. The process of claim 1, wherein each data structure comprises a plurality of linked control blocks.

3. The process of claim 1, wherein step (f) comprises the step of displaying the bitmap signals A1, A2, ..., An and B1, B2, ..., Bm in accordance with an enable/disable flag of each control block of each of the plurality of data structures.

4. The process of claim 3, wherein step (e) comprises the step of generating a current data structure by updating one or more enable/disable flags of a previous data structure.

5. The process of claim 1, wherein each control block comprises a link pointer.

6. The process of claim 1, wherein each control block comprises:

the color space of an unscaled bitmap;

the color space for the display monitor;

the pixel format of the unscaled bitmap;

the dimensions of the unscaled bitmap;

the dimensions of a display window within the display monitor;

the position of the unscaled bitmap; and the position of the display window within the display monitor.

7. The process of claim 1, wherein:

step (a) comprises the steps of:

(1) receiving an encoded video stream A corresponding to the video stream A; and (2) decoding the encoded video stream A to generate the n bitmap signals A1, A2, ..., An.

8. The process of claim 7, wherein step (a)(1) comprises the step of receiving the encoded video stream A from a first remote participant in a video conferencing session.

9. The process of claim 8, wherein step (c) comprises the steps of:

(1) capturing a local video stream corresponding to a local participant in the video conferencing session; and (2) generating the m bitmap signals B1, B2, ..., Bm corresponding to the local video stream.

10. The process of claim 9, wherein step (c) further comprises the steps of:

(3) generating an encoded local video stream corresponding to the local video stream; and (4) transmitting the encoded local video stream to the first remote participant in the video conferencing session.

11. The process of claim 8, wherein step (c) comprises the steps of:

(1) receiving an encoded video stream B corresponding to the video stream B from a second remote participant in the video conferencing session; and (2) decoding the encoded video stream B to generate the m bitmap signals B1, B2, ..., Bm.

12. An apparatus for displaying a plurality of video streams, the plurality of video streams comprising a video stream A and a video stream B, comprising:

(a) means for generating n bitmap signals A1, A2, ..., An corresponding to the video stream A and for generating m bitmap signals B1, B2, ..., Bm corresponding to the video stream B;

(b) means for storing the bitmap signals A1, A2, ..., An in s memory positions in a circular fashion and for storing the bitmap signals B1, B2, ..., Bm in t memory positions in a circular fashion;

(c) means for generating a plurality of data structures, each data structure comprising a plurality of control blocks, each control block comprising information for controlling the display of one of the bitmap signals A1, A2, ..., An and B1, B2, ..., Bm; and (d) means for displaying the bitmap signals A1, A2, ..., An and B1, B2, ..., Bm in accordance with the plurality of data structures, wherein the frame rate of the video stream A is different from the frame rate of the video stream B.

13. The apparatus of claim 12, wherein each data structure comprises a plurality of linked control blocks.

14. The apparatus of claim 12, wherein means (d) comprises means for displaying the bitmap signals A1, A2, ..., An and B1, B2, ..., Bm in accordance with an enable/disable flag of each control block of each of the plurality of data structures.

15. The apparatus of claim 14, wherein means (c) comprises means for generating a current data structure by updating one or more enable/disable flags of a previous data structure.

16. The apparatus of claim 13, wherein each control block comprises a link pointer.

17. The apparatus of claim 12, wherein each control block comprises:

the color space of an unscaled bitmap;

the color space for a display monitor;

the pixel format of the unscaled bitmap;

the dimensions of the unscaled bitmap;

the dimensions of a display window within the display monitor;

the position of the unscaled bitmap; and the position of the display window within the display monitor.

18. The apparatus of claim 12, wherein:

means (a) comprises:

(1) means for receiving an encoded video stream A corresponding to the video stream A; and (2) means for decoding the encoded video stream A to generate the n bitmap signals A1, A2, ..., An.

19. The apparatus of claim 18, wherein means (a)(1) comprises means for receiving the encoded video stream A from a first remote participant in a video conferencing session.

20. The apparatus of claim 19, wherein means (a) comprises:

(1) means for capturing a local video stream corresponding to a local participant in the video conferencing session; and (2) means for generating the m bitmap signals B1, B2, ..., Bm corresponding to the local video stream.

21. The apparatus of claim 20, wherein means (a) further comprises:

(3) means for generating an encoded local video stream corresponding to the local video stream; and (4) means for transmitting the encoded local video stream to the first remote participant in the video conferencing session.

22. The apparatus of claim 19, wherein:

means (a)(1) receives an encoded video stream B corresponding to the video stream B from a second remote participant in the video conferencing session; and means (a)(2) decodes the encoded video stream B to generate the m bitmap signals B1, B2, ..., Bm.

23. A system for displaying a plurality of video streams, the plurality of video streams comprising a video stream A and a video stream B, comprising:

(a) a host processor;

(b) a display monitor; and (c) a video subsystem, the video subsystem comprising:
(1) a memory device; and
(2) a display controller, wherein:

the host processor controls the operations of the system;

the video subsystem generates n bitmap signals A1, A2, ..., An corresponding to the video stream A and generates m bitmap signals B1, B2, ..., Bm corresponding to the video stream B;

the memory device stores the bitmap signals A1, A2, ..., An in s memory positions in a circular fashion and stores the bitmap signals B1, B2, ..., Bm in t memory positions in a circular fashion;

the host processor generates a plurality of data structures, each data structure comprising a plurality of control blocks, each control block comprising information for controlling the display of one of the bitmap signals A1, A2, ..., An and B1, B2, ..., Bm; and the display controller displays the bitmap signals A1, A2, ..., An and B1, B2, ..., Bm on the display monitor in accordance with the plurality of data structures, wherein the frame rate of the video stream A is different from the frame rate of the video stream B.

24. The system of claim 23, wherein each data structure comprises a plurality of linked control blocks.

25. The system of claim 23, wherein the display controller displays the bitmap signals A1, A2, ..., An and B1, B2, ..., Bm in accordance with an enable/disable flag of each control block of each of the plurality of data structures.

26. The system of claim 25, wherein the host processor generates a current data structure by updating one or more enable/disable flags of a previous data structure.

27. The system of claim 23, wherein each control block comprises a link pointer.

28. The system of claim 23, wherein each control block comprises:

the color space of an unscaled bitmap;

the color space for the display monitor;

the pixel format of the unscaled bitmap;

the dimensions of the unscaled bitmap;

the dimensions of a display window within the display monitor;

the position of the unscaled bitmap; and the position of the display window within the display monitor.

29. The system of claim 23, wherein the video subsystem further comprises:

(3) a pixel processor for receiving an encoded video stream A corresponding to the video stream A and for decoding the encoded video stream A to generate the n bitmap signals A1, A2, ..., An.

30. The system of claim 29, wherein said host processor receives the encoded video stream A from a first remote participant in a video conferencing session.

31. The system of claim 30, wherein the video subsystem further comprises:

(4) a video capture controller for capturing a local video stream corresponding to a local participant in the video conferencing session and for generating the m bitmap signals B1, B2, ..., Bm corresponding to the local video stream.

32. The system of claim 31, wherein:

the pixel processor generates an encoded local video stream corresponding to the local video stream; and the host processor transmits the encoded local video stream to the first remote participant in the video conferencing session.

33. The system of claim 30, wherein:

the host processor receives an encoded video stream B corresponding to the video stream B from a second remote participant in the video conferencing session; and the pixel processor decodes the encoded video stream B to generate the m bitmap signals B1, B2, ..., Bm.

* * * * *

UNITED STATES PATENT AND TRADEMARK OFFICE
CERTIFICATE OF CORRECTION

PATENT NO. : 5,548,324
DATED : August 20, 1996
INVENTOR(S) : Terry Downs and Judith A. Goldstein It is certified that error appears in the above-identified patent and that said Letters Patent is hereby corrected as shown below:

In the Claims:
Column 6, line 64:
   After "blocks", insert --,--.
Column 8, line 24:
   Delete "claim 13", and insert therefor --claim 12--.

Signed and Sealed this

Twenty-fifth Day of March, 1997

Attest:

BRUCE LEHMAN

*Attesting Officer*    *Commissioner of Patents and Trademarks*